(12) United States Patent
Panda et al.

(10) Patent No.: US 10,718,101 B2
(45) Date of Patent: Jul. 21, 2020

(54) ECONOMICALLY VIABLE ATMOSPHERIC WATER GENERATOR

(71) Applicants: Priyadarshi Panda, Newark, CA (US); Chaitanya Sharma, Redwood City, CA (US)

(72) Inventors: Priyadarshi Panda, Newark, CA (US); Chaitanya Sharma, Redwood City, CA (US)

( * ) Notice: Subject to any disclaimer, the term of this patent is extended or adjusted under 35 U.S.C. 154(b) by 148 days.

(21) Appl. No.: 15/723,089

(22) Filed: Oct. 2, 2017

(65) Prior Publication Data

US 2019/0100903 A1 Apr. 4, 2019

(51) Int. Cl.
| | |
|---|---|
| *B01D 53/26* | (2006.01) |
| *E03B 3/28* | (2006.01) |
| *B01D 53/04* | (2006.01) |
| *F24F 3/14* | (2006.01) |
| *C02F 1/00* | (2006.01) |
| *C02F 1/32* | (2006.01) |
| *C02F 1/68* | (2006.01) |
| *B01D 53/06* | (2006.01) |
| *C02F 1/44* | (2006.01) |
| *C02F 1/28* | (2006.01) |

(52) U.S. Cl.
CPC ............. *E03B 3/28* (2013.01); *B01D 53/0438* (2013.01); *B01D 53/06* (2013.01); *B01D 53/261* (2013.01); *C02F 1/001* (2013.01); *C02F 1/32* (2013.01); *C02F 1/68* (2013.01); *F24F 3/1429* (2013.01); *B01D 2253/106* (2013.01); *B01D 2253/108* (2013.01); *B01D 2257/80* (2013.01); *B01D 2259/4009* (2013.01); *C02F 1/283* (2013.01); *C02F 1/441* (2013.01); *C02F 2303/04* (2013.01); *C02F 2305/08* (2013.01)

(58) Field of Classification Search
CPC .... C02F 9/00; C02F 1/28; C02F 9/005; C02F 1/44; C02F 1/32; C02F 1/42
USPC .......... 202/185.1–185.3; 95/117–126; 62/94, 62/271; 165/121
See application file for complete search history.

(56) References Cited

U.S. PATENT DOCUMENTS

| | | | | |
|---|---|---|---|---|
| 4,146,372 | A * | 3/1979 | Groth ................. | B01D 53/26 95/124 |
| 4,185,969 | A * | 1/1980 | Bulang ................ | C02F 1/18 95/120 |
| 5,846,296 | A * | 12/1998 | Krumsvik ........... | B01D 5/0066 95/115 |
| 7,905,097 | B1 * | 3/2011 | Fort .................... | B01D 53/261 62/94 |
| 8,506,675 | B2 * | 8/2013 | Ellsworth ........... | B01D 53/261 95/10 |
| 9,587,381 | B2 * | 3/2017 | Turner, Jr. .......... | E03B 3/28 |

(Continued)

*Primary Examiner* — Nina Bhat (57) ABSTRACT

A system of generating water from the air in the most energy efficient manner is provided. The water generating apparatus uses a combination of rotating pre-loader wheels of separation materials, mechanical condensation system such as Vapor Compression Cycle (VCC), filtration and mineral addition units to create an energy efficient system for generating water from ambient air. An IoT water generating apparatus optimized through systems integration including smart controls and programming board for optimizing water production using weather and utility data for energy efficient water production from ambient air.

4 Claims, 5 Drawing Sheets

(56) References Cited

U.S. PATENT DOCUMENTS

| | | | |
|---|---|---|---|
| 2009/0151368 A1* | 6/2009 | Bar | B01D 5/0027 62/94 |
| 2014/0138236 A1* | 5/2014 | White | B01D 5/0006 202/185.3 |
| 2018/0169571 A1* | 6/2018 | Stuckenberg | E03B 3/28 |
| 2019/0184334 A1* | 6/2019 | Moghaddam | B01D 53/263 |

* cited by examiner

ECONOMICALLY VIABLE ATMOSPHERIC WATER GENERATOR

BACKGROUND OF THE INVENTION AND DESCRIPTION OF PRIOR ART

The invention relates to a method and system (machine) that makes water at the location of water usage. This need is spurred by the fact that providing water to remote locations is often difficult. Further, with sea levels rising and land becoming scarce, setting up water transportation infrastructure such as roads for water carrying tankers or transportation pipelines is an added burden in terms of land usage. Transportation of water with tankers and other means uses fuel, which is not a sustainable method of development and growth. For example, soldiers going to war or hikers and campers traveling to remote locations need to carry essential commodities among which is bottles of water. This load can be reduced if they could carry their own water generation device.

Numerous techniques have been developed to obtain potable water. Among the mechanical techniques, the most common is to condense moisture in the air using a refrigerant based cooling coil and collecting the condensed water in a water tank. This technique is intrinsically inefficient due to the limitations of the refrigeration cycle. Details of this technique and examples can be found in U.S. Pat. Nos. 6,755,037, 3,740,959, 4,433,552 and 6,588,225. Another technique removes water from air by compressing the air to such a high extent that water vapor condenses to form liquid water. However this technique is not economically feasible due to high costs and also, not preferable due to moving parts. Details of this technique can be found in U.S. Pat. Nos. 6,453,684 and 6,230,503. The mechanical water generation systems listed above all suffer from reduced efficiency at lower relative humidity. When the relative humidity becomes low, i.e. in the sub 30% range, mechanical water generation systems become very energy inefficient and are not economically feasible. Ironically, low humidity conditions are where there is the greatest need for water generation both portable and otherwise.

To address the inherent inefficiencies of mechanical systems at low humidity, chemical-mechanical systems have been developed which combine chemical means of water extraction with mechanical water condensation. The chemical system in some of these devices is made up of liquid desiccants such as in U.S. Pat. No. 6,156,102. However, liquid desiccant systems have to be constantly refilled and the process of regaining water from water-desiccant mixture through distillation systems suffers from high energy requirements and inability to strip all of the liquid desiccant from recovered water hence leading to chemically contaminated and not pure water. Other desiccant systems have used solid desiccants such as silica gel and molecular sieves. These systems are intrinsically batch processes and hence can be used for limited time. Some prior inventions using solid desiccants can be found in U.S. Pat. Nos. 4,344,778, 4,342,569, 4,313,312, 4,146,372 and 4,219,341. To address this issue of continuous functioning, systems which make use of alternate adsorption desorption beds such as has been mentioned in U.S. Pat. No. 4,304,577 have been designed. However, there has been no focus to optimize the water production quantity and efficiency.

Another design with solid desiccants is the rotating wheel system. This allows for continuous water production and has been commonly used in dehumidifiers. However, the desorbed water is left in the waste streams (impure water) and the water production rate is always lower than in packed bed systems. Implementation of rotating wheel systems can be found in U.S. Pat. Nos. 6,099,623, 5,931,015, 5,526,651, 3,844,737, 5,709,736 and 5,170,633.

A cost effective system to generate pure water which can then be made potable is needed to address these problems. Further the ability to operate in low humidity environments is an added benefit.

SUMMARY OF THE INVENTION

The invention delineates the critical building blocks of a method and a machine that generates water from air. In addition, the invention highlights methods to optimize each of the building blocks. Further, one embodiment of an economically viable water generating machine in which each of the building blocks are implemented in the most energy efficient manner possible is presented. The invention also addresses the need for having a reasonable sized and easily scalable machine. Further, in the preferred embodiment, the machine is "smart" and can learn consumer usage patterns. This enables minimization of costs by producing water at times of reduced utility rates and favorable weather conditions.

The invention as part of one preferred embodiment includes optimizing the solid desiccant based chemical separation system made of silica gels that is arranged in a honeycomb structure called the pre-loader which uses physical forces (such as Van der Waals forces) to separate water out. The silica gel is packed in a unique design to maximize the surface area exposed to air. The dispersion of the silica gel and creation of the honeycomb matrix have been optimized through many different methods with the goal of designing the most efficient system in the preferred embodiment. This invention also describes the further optimization of the water production efficiency by including a mechanical system similar to a vapor compression cycle (VCC) or Peltier coil where the waste heat is used to heat the air stream to desorb the silica gels and collect water in one preferred embodiment. The invention also includes bio-mimicked micro-nano hierarchical structure based films which will be applied to the cooling coils/surfaces and heating coils/surfaces to enhance heat transfer and water harvesting. Furthermore, the invention also describes the use of state-of-the-art low energy filtrations systems to further optimize energy efficiency in one preferred embodiment. The invention in one preferred embodiment uses smart systems to learn user behavior and produce water at times of low electricity costs and favorable weather conditions.

Figure 1:
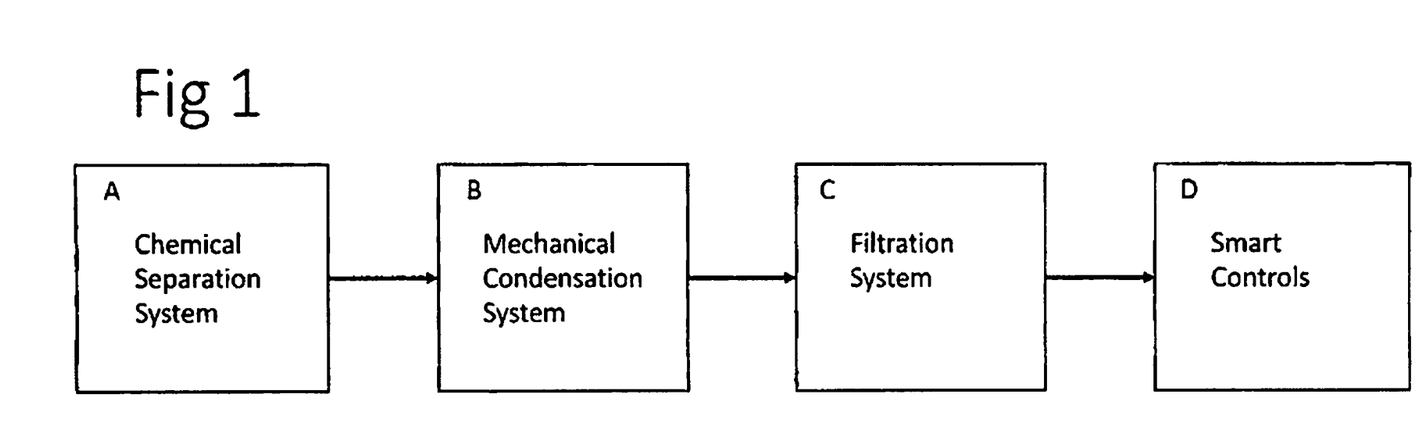
FIG. 1 is a schematic highlighting the building blocks of the air water generator. In embodiments which include all the important building blocks (101,102, 103 and 104), each has to be optimized to make a highly efficient water generation device. However, in the most basic embodiments building blocks 101 and 102 are the minimum required i.e., necessary building blocks to make an atmospheric water generator and can be optimized to create a very basic efficient embodiment.

The invention describes the method for making an air water generator through critical building blocks and one preferred embodiment of such an economically viable water producing machine. In the preferred embodiments for the invention, we describe ways to make each of the critical components shown in FIG. 1, energy efficient leading to an economically viable water generating machine. The governing idea is that mechanical condensation systems are great in extracting water from water rich air streams (high relative humidity). However, these mechanical systems shut down at low relative humidity. Hence, the method for making an economically viable atmospheric water generator provides mechanical condensation systems with water rich streams through chemical systems (pre-loaders) no matter what the weather conditions. One preferred embodiment for such a chemical system is a silica gel desiccant-based chemical adsorption system A stream of ambient air is sucked into the device using a fan and is passed through an air filter before passing through a section of a split condenser coil system of the VCC or hot plate of the Peltier coils in one preferred embodiment. The heated ambient air is passed through one section of the rotating pre-loader wheel extracting moisture from the already loaded (water rich) section of the rotating wheel. This stage is called the unloading stage of the pre-loader since water is unloaded from the wheel rendering this section dry as it rotates. The water rich stream is passed through evaporator coils of the VCC or cold plate of the Peltier coils to condense the moisture out. The condensed water is pumped through a water filtration system before being used for human consumption in one preferred embodiment. The exhaust cold dry stream of air is passed through a heat exchanger in the embodiment before being released to the atmosphere. Another stream of ambient air is sucked into the device using a fan and is passed through an air filter before passing through the heat exchanger and getting cooled by the cold exhaust stream from the evaporator coils of VCC or cold plate of Peltier coils. This cooled and purified ambient air stream is passed through the other section of the rotating pre-loader wheel. Moisture is stripped from the air by the dry half section of the rotating pre-loader wheel from the unloading stage, hence called loading stage of the pre-loader wheel. The dry moisture stripped air form the loading section of the pre-loader wheel is passed through the other section of the split condenser coil system to aid in cooling the split section of the condenser coil in the preferred embodiment.

In one preferred embodiment, the VCC system is optimized with specialized condenser and evaporator coils. The coils are designed specifically to have enhanced surface area exposure through the application of advanced bio-mimicked micro-nano hierarchical structure based films to enhance heat transfer. These bio-mimicked micro-nanoscale engineered surfaces utilize the appropriate surface structure (shape and size) and surface properties (surface energy, contact angle, hydrophobicity/hydrophilicity) to maximize the rate of heat transfer, water condensation and water transport. These engineered surfaces can be utilized in both the condenser/evaporator coils of a VCC or cooling/heating sections of a Peltier coil based system in one preferred embodiment.

Traditional air water generators have used as many as five (5) layers of filtration in addition to UV light for destroying mold and bacteria and single mineral addition system. The invention, in one preferred embodiment, divides the filtration system into 3 critical components i.e., filtration unit, mineral addition unit and UV light. The invention also discusses use of a single unit for each of the above components in place of five (5) layers of filtration for energy efficiency. The invention also aims to make the water generator smart to be able to deliver water based on the behavioral patterns of the household, weather data and electricity costs during the day in one preferred embodiment.

The features and advantages of the method and various embodiments of the present invention are described in the detailed description and drawings below, which is given by way of example only.

DETAILED DESCRIPTION OF THE PREFERRED EMBODIMENTS

The present invention will be understood more fully from the detailed description given below and from the accompanying drawings of the preferred embodiment of the invention, which, however, should not be taken to limit the invention to the specific embodiment but are for explanation and understanding only.

Figure 2A:
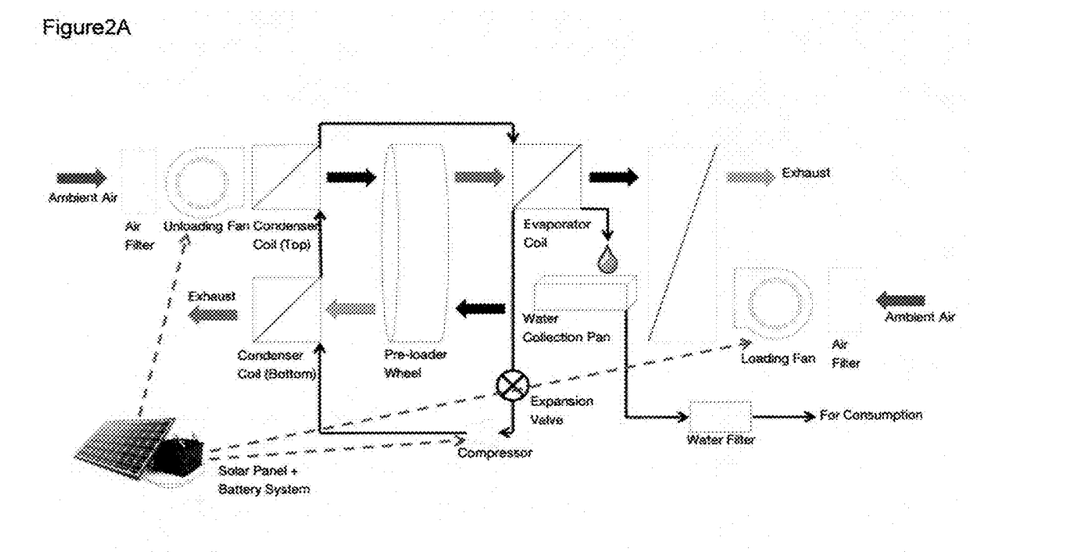
FIG. 2 is a schematic view of the chemical separation system and connections in one preferred embodiment to a mechanical system are shown. Many modified versions of this basic process have been envisioned and a single embodiment realized in a functional machine. The shown embodiment in the figure is a self-sustained system with solar panels+a battery system providing all the power requirements to run the machine.
Figure 2B:
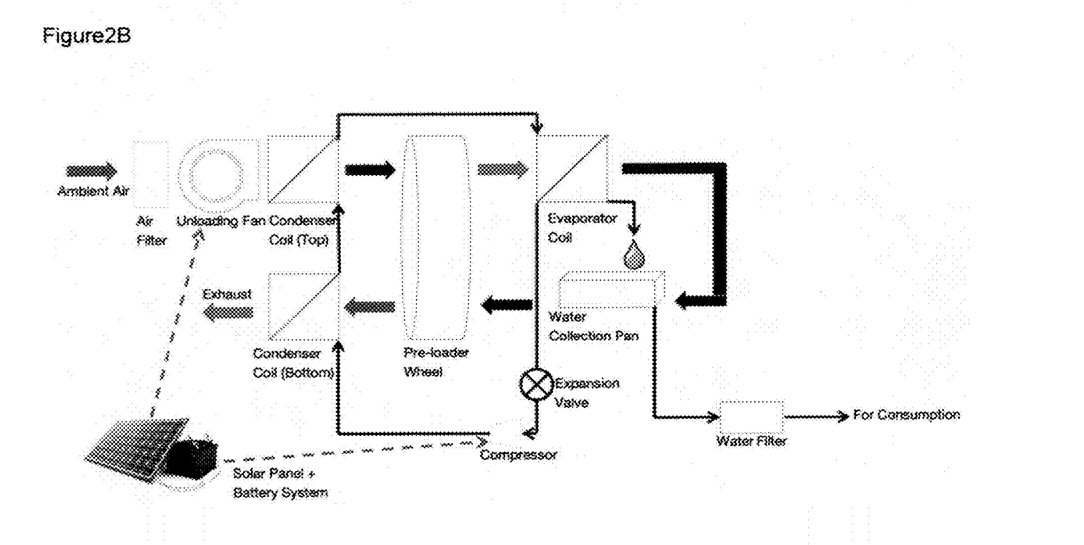
Figure 2C:
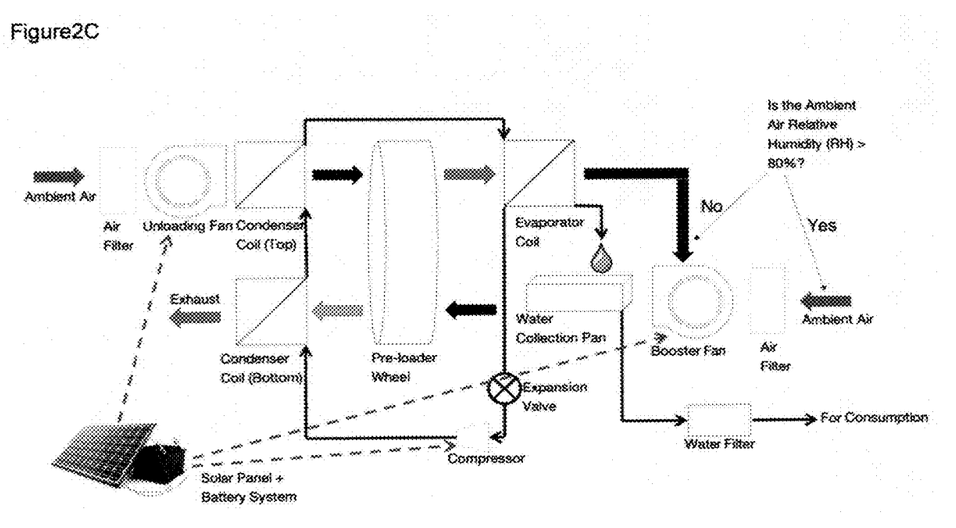
Figure 3A:
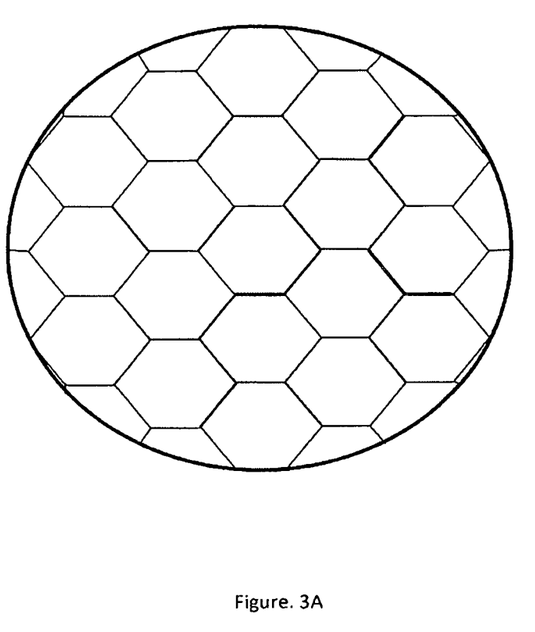
FIG. 3 is a schematic view of a single pre-loader wheel of the chemical system in one preferred embodiment.
Figure 3B:
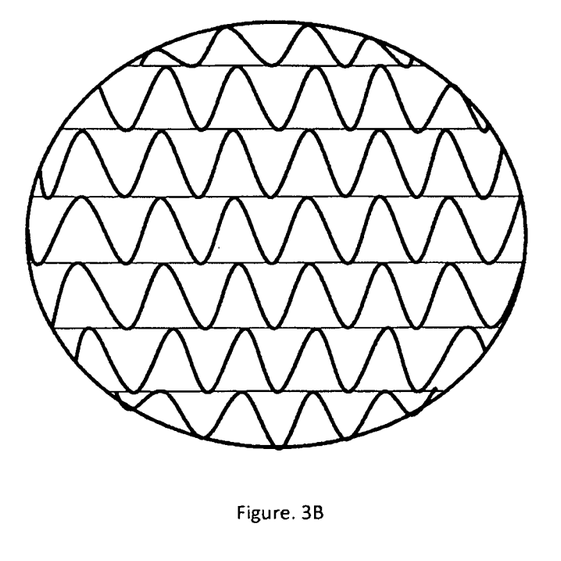

In the preferred embodiment as can be seen in FIG. 2, half of the rotating pre-loader wheel is in adsorption mode while the other half is in desorption mode. The adsorption and desorption times are determined by the rotation speed of the wheel (rpm: revolutions per minute) and sectional cut off the wheel used for adsorption and desorption respectively (for instance if 25% segment of wheel is being used for desorption and 75% adsorption, the adsorption time will be 3× the desorption time). The preferred embodiment shows a 50% split between adsorption and desorption and is only used to explain the process in detail. All potential splits of the pre-loader wheel embodiment into loading and unloading sections is within the scope of this patent.

Ambient air is passed through the section of the pre-loader in the adsorption mode. The pre-loader may comprise of desiccant which may be packed in a honeycomb structure to ensure maximum surface contact with air. Further, the cross section of the pre-loader may be circular or square or rectangular or any other shape to optimize air flow for different situations. In a preferred embodiment the cross section is circular. In the preferred embodiment, the desiccant is silica gel, but a variety of desiccants such as silica gels or molecular sieves (zeolites) may be used and are within the scope of the invention. The desiccant in the pre-loader can absorb moisture up to 40-60% of its weight in one embodiment. The continuous rotation of the pre-loader wheel leads to half of the wheel being in adsorption mode and the other half in desorption mode at all times.

In the desorption mode, a heated stream of air is passed through the loaded/wet desiccant section of the pre-loader wheel to remove moisture from it. In one embodiment, the temperature is 40° C. but the temperature can be varied within the scope of the invention. Temperatures in the range from 35-70° C. or other ranges of temperature for different systems can be used to optimize water removal from the loaded or wet section for desorption. This approach differs from the thermal-swing process because the air stream that enriches the desiccant bed during the loading cycle is different from the air stream that unloads the bed during desorption cycle. However, a thermal swing process with or without optimization combined with any or all other optimizations and/or innovations covered in this patent is within the scope of this patent. As the desorption section of the pre-loader wheel goes through the unloading cycle it gets heated with hot air. Hence this section performs better during adsorption when a cold stream of air is presented to it. Colder air has a higher RH (relative humidity) which enhances the rate of water adsorption and equilibrium water adsorption. Hence, in the preferred embodiment, ambient air is cooled through a heat exchanger by the exhaust stream of air post evaporator coils or cold section of the Peltier coil system.

As illustrated in FIG. 2, the absorption section of the pre-loader wheel is loaded by passing ambient air cooled through the heat exchanger through it. As the air flows through the adsorption section of the wheel, it starts to load by stripping moisture from the air. Once the air is passed through the entire length of the adsorption section of the wheel it is exhausted. The exhaust air is used to cool part of the split condenser before being released to the atmosphere.

As illustrated in FIG. 2, the fully loaded section of the rotating wheel gets unloaded by passing a hot stream of air through it. The air is heated by passing it through one section of the split condensers. Once the hot air has passed through the entire length of the bed it is rich in moisture. This moisture rich stream of air is processed through a mechanical cooling cycle where it is cooled below its dew point to extract all the moisture out of it to form water. The resulting air stream after the mechanical cooling cycle is cold and dry. The moisture enrichment of the air stream through the loaded (unloading) section of the rotating wheel makes the water extraction process in the evaporator very energy efficient. The loaded section gets unloaded through contact with the hot stream and rotates back to get loaded again.

The rotating wheel ensures continuous production of water through loading and unloading of the different sections of the wheel.

In one embodiment of the invention, a VCC based mechanical cooling system is used. In this approach the stream of air that will be passed through the unloading section of the pre-loader wheel is first passed through part of the split condenser coils of VCC where the refrigerant rejects heat to make it hot. In this preferred embodiment, this section of the split condenser system is coated with advanced bio-mimicked micro-nano hierarchical structure based films to enhance heat transfer to heat the air stream more effectively. The refrigerant shown in FIG. 2 is R410A, however, this is not the only refrigerant that can be used. Any other refrigerant that further optimizes the energy consumption of this cycle can also be used with this invention and forms a part of the scope of this disclosure.

The heat rejected from part of the split condenser helps in heating up the air stream used for desorption. Once this air stream has extracted moisture from the pre-loader wheel, it passes through the evaporator coils where it is cooled to below its dew point temperature. The resulting air stream is cold and dry. In this preferred embodiment, the evaporator coils are coated with advanced bio-mimicked micro-nano hierarchical structure based films to enhance heat transfer to increase the efficiency of water condensation. The films surface structure (shape and size) and surface properties (surface energy, contact angle, hydrophobicity/hydrophilicity) enhance the rate of water condensation. Films for surface area enhancement with and without surface characteristics are included in the scope of this patent.

In another embodiment of the invention, using the VCC based mechanical cooling system, the resulting exhaust cold air stream is passed through a heat exchanger to pre-cool the incoming moisture laden hot stream of air. This will reduce the cooling load on the compressor further improving the production efficiency.

In another embodiment of the invention, using the VCC based mechanical cooling system, the resulting exhaust cold air stream post the evaporator is passed through a heat exchanger to cool the incoming ambient air to enhance the loading dynamics in the loading section of the pre-loader wheel as shown in FIG. 2.

In another embodiment of the invention, a Peltier coil based mechanical cooling system is used. Peltier coils are an array of thermocouples that are arranged so that when you pass current through them they create heated and cooled plates. Analogous to the VCC approach, the heated plate can help in heating up the air stream used for desorption. The cooled plate can cool the moisture laden hot stream of air. The plates of the Peltier coil system will also be coated with the bio-mimicked micro-nano hierarchical structure based films that will enhance the heat transfer properties of them. Even in this configuration the idea of using the resulting cold dry air stream to cool the incoming moisture laden hot air stream or ambient air for loading as described for the VCC based cooling system, can be implemented. Any combination of a mechanical cooling system can be used with the chemical separation process depending on the market needs which define the yield (total gallons of water produced per day) and efficiency (gallons of water/kWh of energy) needed for the machine to be economically viable.

The combined chemical-mechanical system is designed to use the most energy efficient fans, valves and pumps to ensure the most cost effective production of water.

One embodiment of the valves can include ball valves which have the lowest head loss and are the most energy efficient during operation.

Another embodiment can include butterfly valves which are cheaper and ensure the lowest construction cost for the air water generator.

Once the water has been produced, it may optionally be collected and pumped up through a filter bank, where it is filtered and then passed through a mineral deposition unit to add minerals to give the water taste. The water can then be stored in a storage tank, and optionally can be equipped with a UV light filter to eliminate chances of microorganism growth.

One embodiment of the filter bank can include using five filters: sediment filter, pre-carbon filter, ultrafine membrane, post carbon filters and mineral filters. Minerals that need to be added to water made from air to make it fit for human consumption. One embodiment of the minerals can include adding Calcium (Ca), Magnesium (Mg), Potassium (K), Sodium (Na), Copper (Cu), Zinc (Zn), Selenium (Se) and Manganese (Mn).

Another embodiment of the filter bank can be to include a nanoparticle filtration system [M. U. Sankar et al., PNAS, 2013, 110, 21, 8459-8464]. Nanoparticle filters do not have a reject water stream which means all the water that passes through them gets filtered in a single pass, resulting in lowering the pumping energy needed to flow the water through the filters.

A final embodiment of the filter bank can include state of the art capacitive deionization filters which are very energy efficient and have long shelf life. Deionization filters provide the same advantage as nanoparticle filters in terms of no reject water stream leading to lower pumping energy and greater availability of usable/drinking water.

The optional UV light filter to eliminate chances of microorganism growth can be made more energy efficient by utilizing an light emitting diode (LED) light based version. An LED based version has a long life thereby resulting in a much-reduced life cycle cost.

Another embodiment of the invention includes the use of smart controls to further optimize the operation of the machine in the most energy efficient manner. In a preferred embodiment, machine learning principles are employed to learn the water consumption patterns of the user which will help it decide at what times during the day production needs to happen.

Another embodiment of smart controls will include connecting the invention to the Internet to make it an Internet of things (IoT) device. The Internet will connect the machine to a local weather station that will help it determine when the weather conditions are favorable to produce water.

Another embodiment of smart controls will include programming the time of use pricing of the local electric utility company to determine the most economical times to produce water.

Various modifications and adaptations of the operations that are described here would be apparent to those skilled in the art based on the above disclosure. Many variations and modifications within the scope of the invention are therefore possible. The present invention is set forth by the following claims.

The invention claimed is:

1. A method of generating water from an air-water generator comprising the steps of:
    passing ambient air through an air-water generator comprising a rotating pre-loader including a partitioned wheel and chemical separation unit operating in adsorption and desorption modes; said pre-loader including two inlets and two outlets; said pre-loader in operative connection with a condensation system comprising a condenser, compressor, evaporator connected to said inlets and outlets for chemical separation of the ambient air into a gas stream and liquid stream; further processing said liquid stream through a filtration system comprising at least one filtration unit and demineralization units to generate water.

2. The method of claim 1, wherein the chemical separation unit includes a honeycomb desiccant, wherein the desiccant is selected from silica gel for absorption and desorption of water.

3. The method of claim 1, wherein the evaporator is a Peltier coil system wherein said Peltier coils are coated with bio-mimicked, micro-nano hierarchical based films to enhance heat transfer and evaporation.

4. A water generator for producing water comprising:
    a rotating pre-loader including a partitioned wheel and chemical separation unit operating in adsorption and desorption modes; said pre-loader including two inlets and two outlets; said pre-loader in operative connection with a condensation system comprising a condenser, compressor, evaporator connected to said inlets and outlets for chemical separation of the ambient air into a gas stream and liquid stream; further processing said liquid stream through a filtration system comprising at least one filtration unit and demineralization units to generate water; said water generator further including wireless network enabled controllers in operative connection said pre-loader, chemical separation units and condensation system.

* * * * *